(12) United States Patent
Wu et al.

(10) Patent No.: US 10,887,500 B2
(45) Date of Patent: Jan. 5, 2021

(54) OPTICAL INSPECTION SYSTEM

(71) Applicant: Hong Kong Applied Science and Technology Research Institute Co. Ltd., Hong Kong (CN)

(72) Inventors: Changli Wu, Shenzhen (CN); Ying Liu, Hong Kong (CN)

(73) Assignee: Hong Kong Applied Science and Technology Research Institute Co., Ltd., Shatin (HK)

(*) Notice: Subject to any disclaimer, the term of this patent is extended or adjusted under 35 U.S.C. 154(b) by 441 days.

(21) Appl. No.: 15/413,431

(22) Filed: Jan. 24, 2017

(65) Prior Publication Data

US 2018/0213134 A1    Jul. 26, 2018

(51) Int. Cl.
*H04N 5/225* (2006.01)
*G06T 7/00* (2017.01)
*G01N 21/88* (2006.01)

(52) U.S. Cl.
CPC ....... *H04N 5/2256* (2013.01); *G01N 21/8806* (2013.01); *G01N 21/8851* (2013.01); *G06T 7/0004* (2013.01); *G01N 2021/8822* (2013.01); *G01N 2021/8825* (2013.01); *G01N 2021/8887* (2013.01); *G06T 2207/10152* (2013.01); *G06T 2207/30108* (2013.01)

(58) Field of Classification Search
CPC ............. H04N 5/2256; G01N 21/8806; G01N 21/8851; G01N 2021/8822; G06T 7/0004; G06T 2207/10152; G06T 2207/30108
USPC .......................................................... 348/92
See application file for complete search history.

(56) References Cited

U.S. PATENT DOCUMENTS

| | | | |
|---|---|---|---|
| 6,175,645 B1 * | 1/2001 | Elyasaf .............. | G01N 21/8806 356/237.4 |
| 6,671,041 B2 | 12/2003 | Okahira et al. | |
| 7,420,671 B2 | 9/2008 | Sonda | |
| 7,477,383 B2 | 1/2009 | Furman et al. | |

(Continued)

FOREIGN PATENT DOCUMENTS

| CN | 101034069 A | 9/2007 |
|---|---|---|
| CN | 103884650 A | 6/2014 |

(Continued)

OTHER PUBLICATIONS

International Search report and Written Opinion issued for PCT Application No. PCT/CN2017/072728, dated Nov. 7, 2017, 8 pages.

*Primary Examiner* — Nathan J Flynn
*Assistant Examiner* — Caroline Somera
(74) *Attorney, Agent, or Firm* — Norton Rose Fulbright US LLP (57) ABSTRACT

Optical inspection system detects defects of an object, such as an electronic device during manufacturing. The optical inspection system includes a first linear light source that irradiates a first light beam on a top surface of the object along a scan line across the width of the object. A second linear light source forms an angle with the first linear light source and irradiates a second light beam on a side surface of the object. A camera receives scattered light from the top surface and the side surface of the object and captures a subimage of the object along the scan line. An image processing system receives each subimage from the camera, stitches the subimages, and detects defects on the top surface and the side surface of the object.

5 Claims, 6 Drawing Sheets

(56) References Cited

U.S. PATENT DOCUMENTS

| | | | |
|---|---|---|---|
| 7,551,274 B1 | 6/2009 | Wornson et al. | |
| 10,180,401 B2* | 1/2019 | Ono | G01N 21/892 |
| 2005/0200837 A1 | 9/2005 | Mydlack et al. | |
| 2007/0103893 A1* | 5/2007 | Tanaka | G01N 21/4788 |
| | | | 362/138 |
| 2007/0211242 A1* | 9/2007 | Okabe | G01N 21/8806 |
| | | | 356/237.2 |
| 2007/0216897 A1* | 9/2007 | Sonda | G01N 21/896 |
| | | | 356/239.1 |
| 2008/0174771 A1* | 7/2008 | Yan | G01N 21/8901 |
| | | | 356/237.5 |
| 2009/0310239 A1* | 12/2009 | Adler | G01N 21/8806 |
| | | | 359/891 |
| 2010/0118136 A1* | 5/2010 | Riet | G01B 11/306 |
| | | | 348/92 |
| 2011/0007149 A1 | 1/2011 | Diehr | |
| 2014/0042332 A1 | 2/2014 | Shimura | |
| 2014/0210946 A1 | 7/2014 | Hsiao | |
| 2014/0240489 A1 | 8/2014 | Furnas | |
| 2015/0226675 A1 | 8/2015 | Jiang | |
| 2017/0053394 A1* | 2/2017 | Uemura | G06T 7/0004 |
| 2017/0236266 A1* | 8/2017 | Rostami | H04N 5/2256 |
| | | | 348/131 |
| 2019/0178812 A1* | 6/2019 | Richard | G01N 21/8806 |

FOREIGN PATENT DOCUMENTS

| | | |
|---|---|---|
| CN | 204359710 U | 5/2015 |
| CN | 104897693 A | 9/2015 |
| CN | 104914109 A | 9/2015 |
| CN | 205139032 U | 4/2016 |
| CN | 105939434 A | 9/2016 |
| JP | 11108637 | 4/1999 |
| WO | 2014007542 A1 | 1/2014 |

* cited by examiner

OPTICAL INSPECTION SYSTEM

FIELD OF THE INVENTION

The present invention relates to an optical inspection system that detects defects of an object.

BACKGROUND

Defects such as scratches, crashes, cracks, pin-holes, bubbles, or smudges occur during manufacturing and installation of cover glass onto electronic devices, for example, smart phones. If these defects are not detected, then a faulted product would be sold to consumers.

New methods and systems that provide improved optical inspection system with improved efficiency and accuracy in detecting the defects will assist in advancing technological needs and solving technological problems.

SUMMARY OF THE INVENTION

One example embodiment is an optical inspection system that detects defects of an object, such as an electronic device during manufacturing. The optical inspection system includes a first linear light source that irradiates a first light beam on a top surface of the object along a scan line across the width of the object. A second linear light source forms an angle with the first linear light source and irradiates a second light beam on a side surface of the object. A camera receives scattered light from the top surface and the side surface of the object and captures a subimage of the object along the scan line. An image processing system receives each subimage from the camera, stitches the subimages, and detects defects on the top surface and the side surface of the object.

Other example embodiments are discussed herein.

DETAILED DESCRIPTION

Example embodiments relate to apparatus and methods that inspect and capture defects on top and side surfaces of an object.

Many smart phones use cover glass with a curved edge, which is called 2.5D cover glass. Most defect inspection apparatus are not able to detect defects at the edge or the side surface of the 2.5D cover glass. As such, smart phones with faulty or damaged covers are sold to consumers.

Example embodiments solve this problem by providing an optical inspection system that includes linear light sources, cameras, and an image processing system. The system produces high-contrast images and detects a wide variety of defects, including very faint defects, at a high flow of object movement. Example embodiments are able to detect defects at the edge or side surfaces of electronic devices (such as smart phones) during manufacturing and prevent faulty or damaged products from being sold to consumers.

A first linear light source in the optical inspection system irradiates a light beam on a top surface along the width of an object under inspection. A second linear light source irradiates a light beam on a side surface or edge of the object. The second linear light source forms an angle with the first linear light source, such as an angle within a range of 35-45 degrees. The camera receives scattered light from the top and side surfaces of the object and captures subimages of the object. The image processing system receives each subimage from the camera, stitches the subimages, and detects defects on the top and side surfaces of the object.

In one example embodiment, the light beam from the first linear source forms an incident angle within a range of 20-30 degrees with a normal line of the top surface of the object from a side-view of the optical inspection system. A central axis of the camera forms an angle with the normal line that is different than the incident angle of the light beam in order to prevent reflected light from the object from entering the field of view of the camera.

In one example embodiment, a diffuser is positioned between the linear light source of the bright field illumination system and the object to improve the contrast of the defect images.

Another example embodiment includes an optical inspection system with dark field illumination that includes two illumination systems, each emitting three light beams from three linear light sources. A camera is positioned between the two illuminating systems to capture subimages of the object along the width. An image processing system receives each subimage from the camera, stitches the subimages, and detects defects on the top and side surfaces of the object.

In one example embodiment, an incident light from the first and second illumination systems forms an incident angle within a range of 20-30 degrees with a normal line of the top surface from a side-view of the optical system. A central axis of the camera coincides a normal line of the top surface of the object such that the camera receives scattered light from the object that is under illumination of the first and second illuminating systems.

In one example embodiment, a controller controls the angle between the linear light sources of the illumination system based on a shape and an orientation of the side surface or edge of the object.

In one example embodiment, the object under inspection is moved at a fixed speed in a horizontal plane, such as along a conveyor belt during manufacturing or installation. The object is separately illuminated by a bright field system and a dark field system such that defects can be effectively captured in one flow no matter the object under inspection has a dark color or a bright color.

Figure 1:
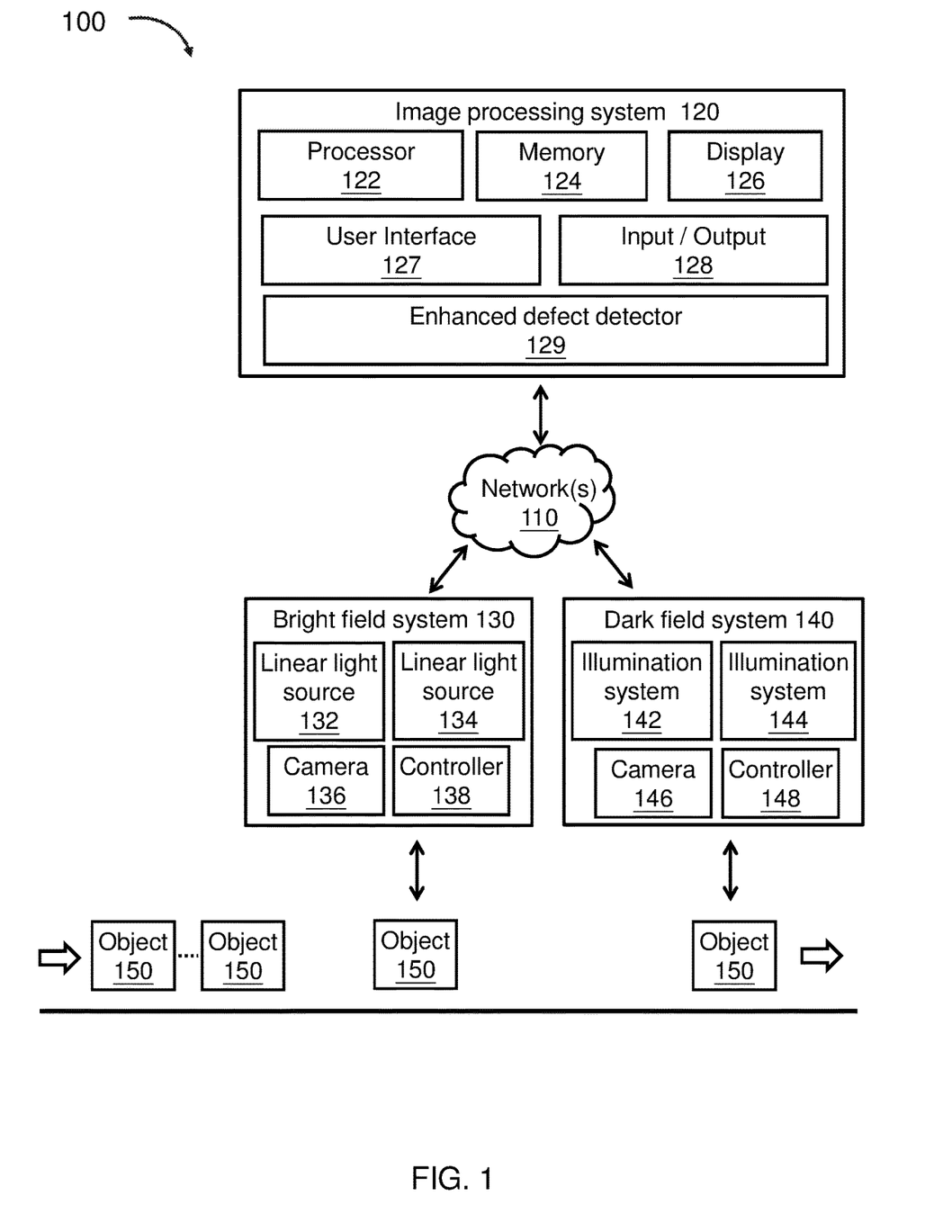
FIG. 1 shows a block diagram of an optical inspection system in accordance with an example embodiment.

FIG. 1 shows a block diagram of an optical inspection system 100 in accordance with an example embodiment. The optical inspection system 100 includes a bright field system or an optical inspection system with bright field illumination 130, a dark field system or an optical inspection system with dark field illumination 140, and an image processing system 120. One or more elements in the optical inspection system 100 can communicate with each other through one or more networks 110. A plurality of objects 150 are inspected by the optical inspection system.

The networks 110 can include one or more of the internet, an intranet, an extranet, a cellular network, a local area network (LAN), a Wi-Fi network, a home area network (HAN), a metropolitan area network (MAN), a wide area network (WAN), a Bluetooth network, public and private networks, wired and wireless communications, etc.

The bright field system 130 includes linear light sources 132 and 134, a camera 136 and a controller 138. The first linear light source 132 irradiates a light beam on a top surface along the width of an object under inspection. The second linear light source 134 irradiates a light beam on a side surface or edge of the object. The camera 136 receives scattered light from the top and side surfaces of the object and captures subimages of the object. The controller 138 controls the angle between the first linear light source and the second linear light source based on a shape and an orientation of the side surface of the object. As one example, the second linear light source forms an angle within a range of 35-45 degrees with the first linear light source.

The dark field system 140 includes illumination systems 142 and 144, a camera 146 and a controller 148. Each of the two illumination systems emits light beams onto the objects under inspection. The camera 146 is positioned between the two illuminating systems to capture subimages of the object along the width. The controller 148 controls an incident angle of the light beams.

The image processing system 120 includes a processor 122, a memory 124, a display 126, a user interface 127, an input/output (I/O) 128 and an enhanced defect detector 129. As one example, the I/O 128 obtains subimages from the camera 136 or 146 through the networks 110. The memory 124 stores instructions for the processor 122 to execute. The processor processes the subimages and displays the processed image on the display 126.

The enhanced defect detector 129 is an example of specialized hardware and/or software that assists in improving performance of a computer and/or execution of methods discussed herein. The enhanced defect detector stitches the subimages and detects defects from the stitched images. Example functions of the enhanced defect detector are discussed in FIG. 5 and other example embodiments.

In one example embodiment, the object 150 under inspection is moved at a fixed speed in a horizontal plane such that the object is separately illuminated by the bright field system and the dark field system. The object under inspection can be any color, and the surface of the objects can be transparent, semi-transparent, reflective, refractive, or absorptive.

Figure 2A:
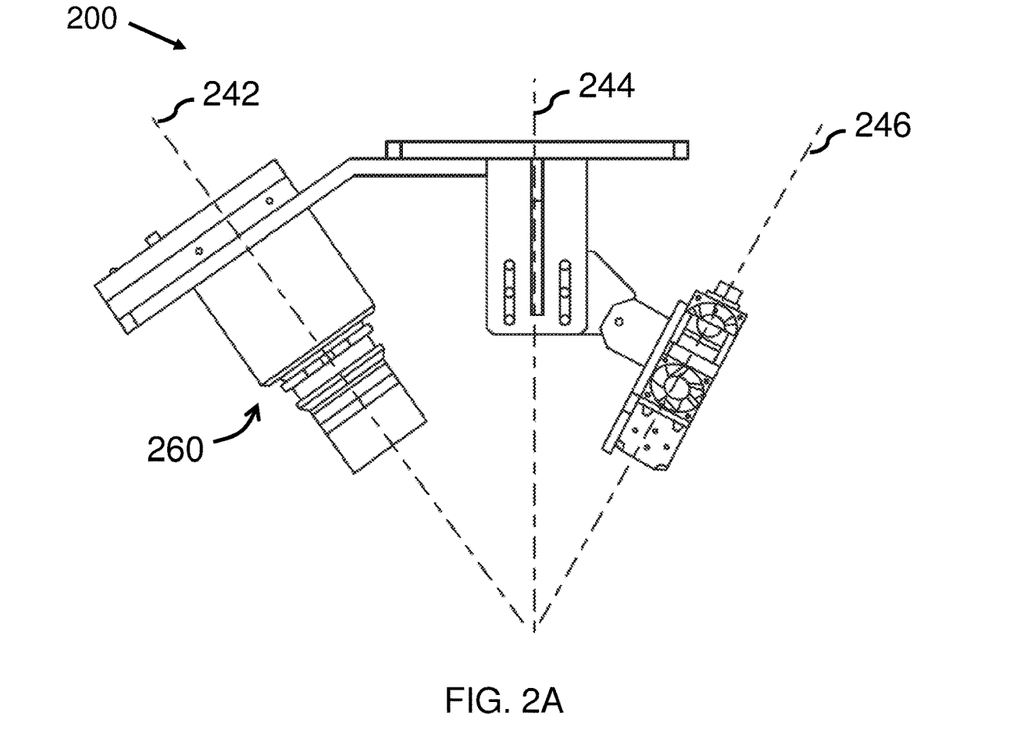
FIG. 2A shows a side-view of a bright field system in accordance with an example embodiment.

FIG. 2A shows a side-view of a bright field system 200 in accordance with an example embodiment.

Figure 2B:
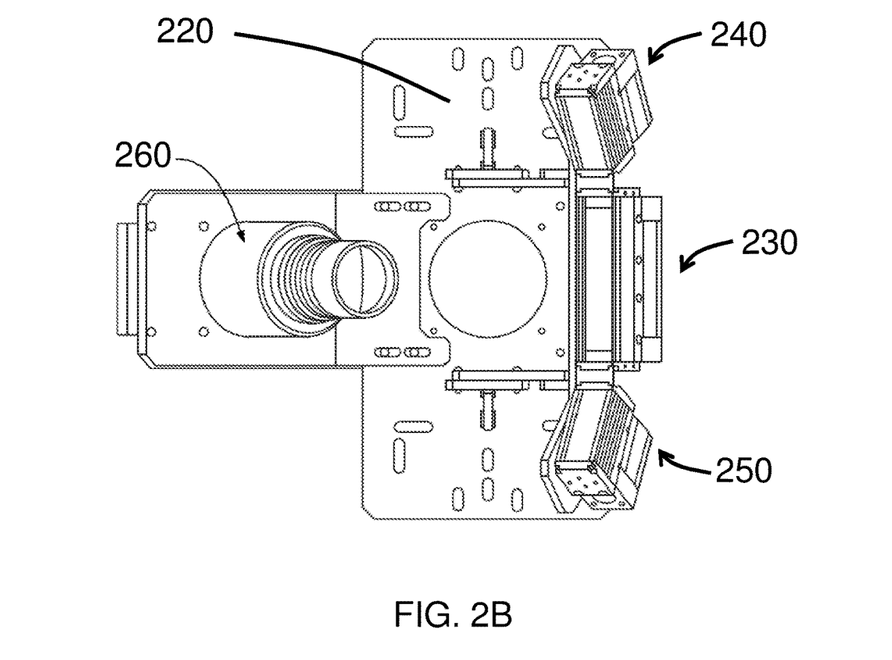
FIG. 2B shows a bottom-view of a bright field system in accordance with an example embodiment.

FIG. 2B shows a bottom-view of the bright field system 200 in accordance with an example embodiment.

As shown in FIG. 2A and FIG. 2B, the bright field system 200 includes three linear light source 230, 240 and 250, a camera 260 and a frame 220 as a support. The central axis 246 of the linear light sources forms a first angle with the normal line 244 of the bright field system 200. The central axis 242 of the camera forms a second angle with the normal line 244. The first angle and the second angle are different such that a minimal amount of reflected light from the object enters the camera.

As one example, the first angle formed by line 244 and line 246 is 27 degrees or any number that falls within 20-30 degrees. The second angle formed by line 244 and line 242 is 35 degrees or any number that falls within a range of 30-40 degrees.

By way of example, the first linear light source 230 has a length longer than the width of the object under inspection and irradiates a first light beam on a top surface of the object along a scan line across the width of the object. The linear light sources 240 and 250 are shorter compared to the linear light source 230 and are positioned on each side of the linear light source 230. The linear light sources 240 and 250 irradiate light beams on side surfaces or edges of the object. The camera 260 receives scattered light from the top surface and the side surfaces of the object that is under illumination of the linear light sources. The camera captures subimages of the object along plural scan lines.

In one example embodiment, linear light source 240 or 250 forms an angle of 40 degrees with the linear light source 230. A controller controls the angle to be within 35-45 degrees, based on a shape and an orientation of the side surface of the object.

Figure 3A:
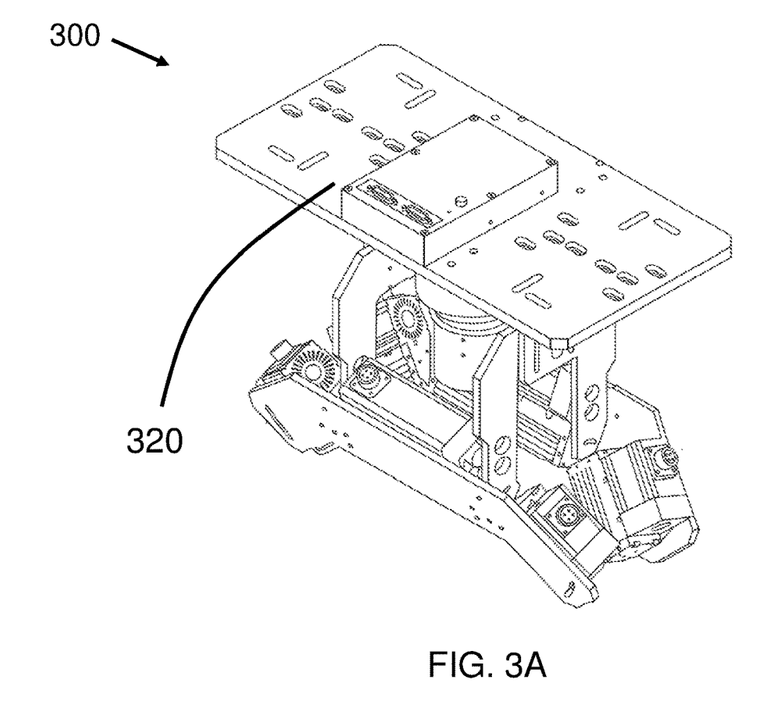
FIG. 3A shows a side-view of a dark field system in accordance with an example embodiment.

FIG. 3A shows a side-view of a dark field system 300 in accordance with an example embodiment.

Figure 3B:
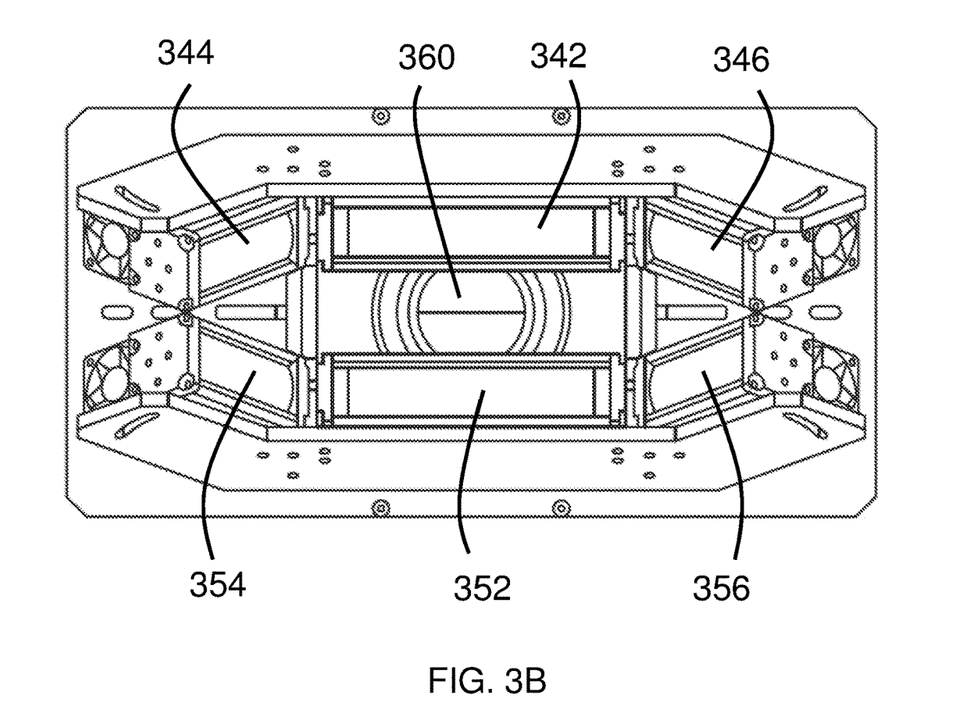
FIG. 3B shows a bottom-view of a dark field system in accordance with an example embodiment.

FIG. 3B shows a bottom-view of the dark field system 300 in accordance with an example embodiment.

As shown in FIG. 3A and FIG. 3B, the dark field system 300 includes a camera 360, three linear light source 342, 344 and 346 on one side of the camera, three linear light source 352, 354 and 356 on one another side of the camera, and a frame 320 as a support. The camera 360 receives scattered light from the top surface and the side surface or edge of the object that is under illumination of the linear light sources. The camera captures subimages of the object along plural scan lines.

The linear light sources 342 and 352 each have a length longer than the width of the object under inspection and irradiate a first light beam on a top surface of the object along a scan line across the width of the object. The linear light sources 344, 346, 354 and 356 are shorter compared to the linear light source 342 or 352. The linear light sources 344 and 346 are positioned on each side of the linear light source 342. The linear light sources 354 and 356 are positioned on each side of the linear light source 352. The linear light sources 344, 346, 354 and 356 irradiate light beams on side surfaces of the object.

In one example embodiment, linear light source 344 or 346 forms an angle of 40 degrees with the linear light source 342. Linear light source 354 or 356 forms an angle of 40 degrees with the linear light source 352. A controller controls the angle to be within 35-45 degrees, based on a shape and an orientation of the side surface of the object.

In one example embodiment, an incident light from the light sources forms an incident angle within a range of 20-30 degrees with a normal line of the top surface of the object under inspection from a side-view of the optical system. A central axis of the camera coincides a normal line of the top surface of the object such that the camera receives scattered light from the object that is under illumination of the light sources.

Figure 4:
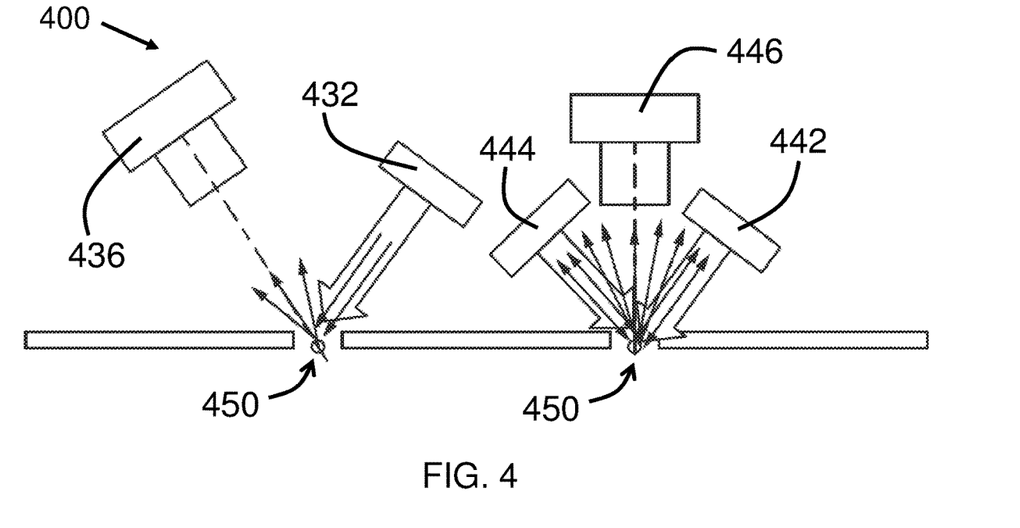
FIG. 4 shows an optical inspection system in accordance with an example embodiment.

FIG. 4 shows an optical inspection system 400 in accordance with an example embodiment. The optical inspection system 400 includes a bright field illumination system 432, two dark field illumination systems 442 and 444, and cameras 436 and 446. A plurality of objects 450 are inspected by the optical inspection system.

By way of example, the bright field illumination system 432 irradiates plural light beams on top and side surfaces or edges of the object along a scan line across the width of the object. In one example, the bright field illumination system is positioned above the object by at least 150 millimeters. In one example embodiment, the light beams from the bright field illumination system form an angle of 27 degrees with a normal line of the top surface of the object from a side-view of the optical inspection system.

In one example embodiment, a central axis of the camera 436 forms an angle with a normal line of the top surface of the object that is different than an incident angle of the light beams from the bright field illumination system from a side-view of the optical inspection system.

In one example embodiment, a diffuser is positioned between the bright field illumination system and the object under inspection to improve the contrast of the images captured by the camera. As one example, the camera includes a lens and a plurality of pixel sensors. The pixel sensors are arranged in a matrix-shape with a 1×N configuration, with N being integers greater than 1.

In one example embodiment, the camera is a time delay integration (TDI) camera that includes a lens and a TDI image sensor that detects and conveys the information that constitutes an image. The image sensor is made of a TDI charge-couple device (CCD) or a complementary metal-oxide-semiconductor (CMOS). The TDI image sensor is a two-dimensional array that has multiple elements arranged in a matrix-shape with an M×N configuration, with M and N being integers greater than 1. Each row shifts its partial measurements to the adjacent row synchronously with the motion of the image across the array of elements.

In one example embodiment, the light beams from the bright field illumination system form a straight line along the width of the object from a top-view of the object.

By way of example, the dark field illumination system 442 or 444 irradiates plural light beams on top and side surfaces of the object along a scan line across the width of the object. In one example, the dark field illumination system is positioned above the object by at least 110 millimeters. In one example embodiment, the light beams from the dark field illumination system form an angle of 22 degrees with a normal line of the top surface of the object from a side-view of the optical inspection system. The camera 446 is positioned between the dark field illumination system 442 and the dark field illumination system 444. In one example embodiment, a central axis of the camera coincides a normal line of the top surface of the object such that the camera receives scattered light from the object that is under illumination of the first and second illuminating systems. The camera captures a subimage of the object along the scan line.

In one example embodiment, all of the light beams from the dark field illumination systems 442 and 444 converge on a straight line across the width of the object to form a scan line.

Consider an example in which an object is placed on a conveyor belt to move at a fixed, constant, or variable speed in a horizontal plane. The object is being inspected by the inspection system 400 by separately going through the bright field illumination system and the dark field illumination system. The camera in each illumination system captures subimages of the object along plural scan lines that are across different parts or regions of the object. An image processing system processes and stitches the subimages and produces a bright field image and a dark field image for the object. The combination of bright field image and the dark field image allows the detection of a wider variety of defects, including coating flaws as well as digs, scratches, grind errors, internal flaws, and others.

For both of the bright field illumination system and the dark field illumination system, the camera in each system is positioned such that its central axis forms an angle with the normal line of the top surface of the object that is different than the incident angle of the light beam. Therefore, a minimal amount of reflected light off the object enters the camera. Light beams from the light sources, reflected off the object surface without defects, do not enter the camera. If light beams are scattered by a defect on the top or side surface of the object, the light beams have a high probability of entering the camera.

Conversely, the reflected light from an area of the object without defects is outside the area seen by the camera. A higher percentage of the reflected light ends up in the camera when a defect is present on the object than in the absence of a defect.

Figure 5:
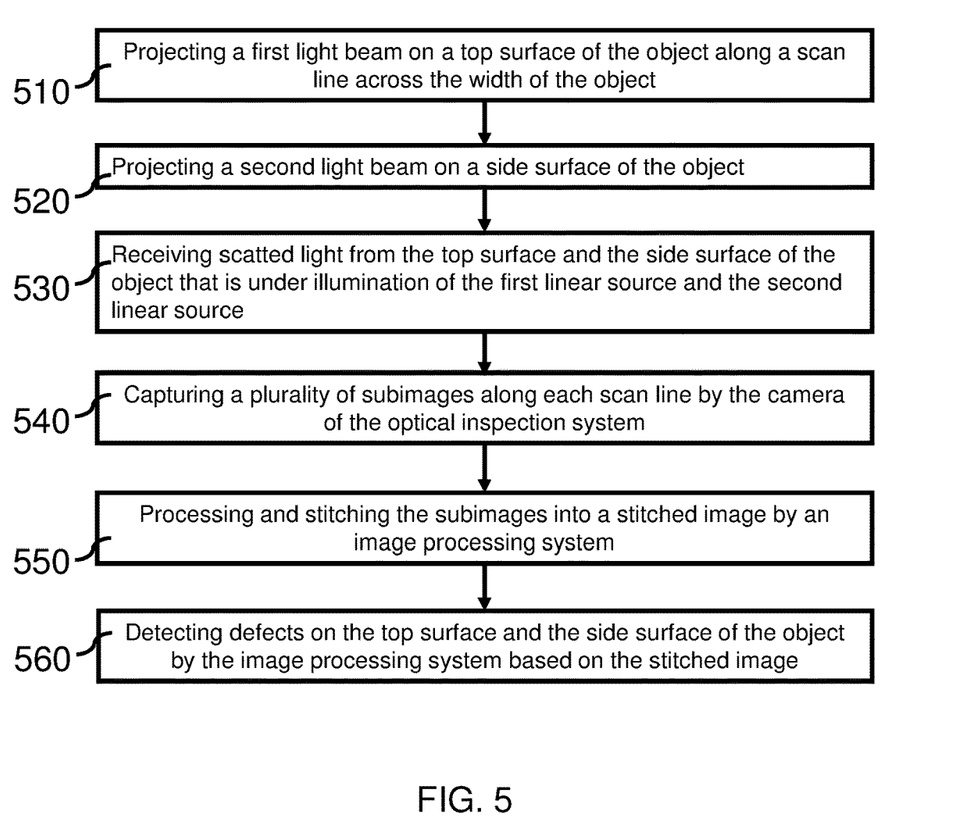
FIG. 5 shows a method to detect defects on an object in accordance with an example embodiment.

FIG. 5 shows a method to detect defects on an object in accordance with an example embodiment.

Block 510 states projecting a first light beam on a top surface of the object along a scan line across the width of the object.

Block 520 states projecting a second light beam on a side surface of the object Consider an example in which an illumination system is equipped with two light sources and projects light beams on an object that is under inspection. As one example, the light sources are linear LED arrays shaped by lens or laser light sources. A first light source of the illumination system projects a first light beam on a top surface of the object. The first light beam spans across the width of the object and has a length longer than the width of the object. The second light source is positioned beside the first light source, forming an angle within a range of 35-45 degrees with the first light source. The second light source projects light beams on side surfaces or edges of the object, forming a straight scan line with the first light beam, on the object.

Block 530 states receiving scatted light from the top surface and the side surface of the object that is under illumination of the first linear source and the second linear source.

By way of example, a camera receives scattered light from the top surface and the side surface of the object that is under illumination of the illumination system. The object under inspection moves at a fixed speed in a horizontal plane such that the scan line formed by the illumination system runs across different parts of the object. The camera captures subimages of the object along plural scan lines that are across different parts of the object.

Block 540 states capturing a plurality of subimages along each scan line by the camera of the optical inspection system By way of example, the camera includes a lens and a plurality of linear pixel sensors. The linear pixel sensors are arranged in a matrix-shape with a 1×N configuration, with N being integers greater than 1. As such, each subimage captured by the camera along each scan line is in a form of a long strip.

Block 550 states processing and stitching the subimages into a stitched image by an image processing system Block 560 states detecting defects on the top surface and the side surface of the object by the image processing system based on the stitched image Consider an example in which an image processing system includes a processor, a memory, a display, an input/output (I/O) and an enhanced defect detector. As one example, the I/O obtains subimages from the camera. The memory stores instructions for the processor to execute. The processor processes the subimages and displays the processed image on the display. The enhanced defect detector is an example of specialized hardware and/or software that assists in improving performance of a computer and/or execution of methods discussed herein. The enhanced defect detector stitches the subimages and detects defects from the stitched images. Example defect images are discussed in FIG. 6 and FIG. 7 and other example embodiments.

Figure 6:
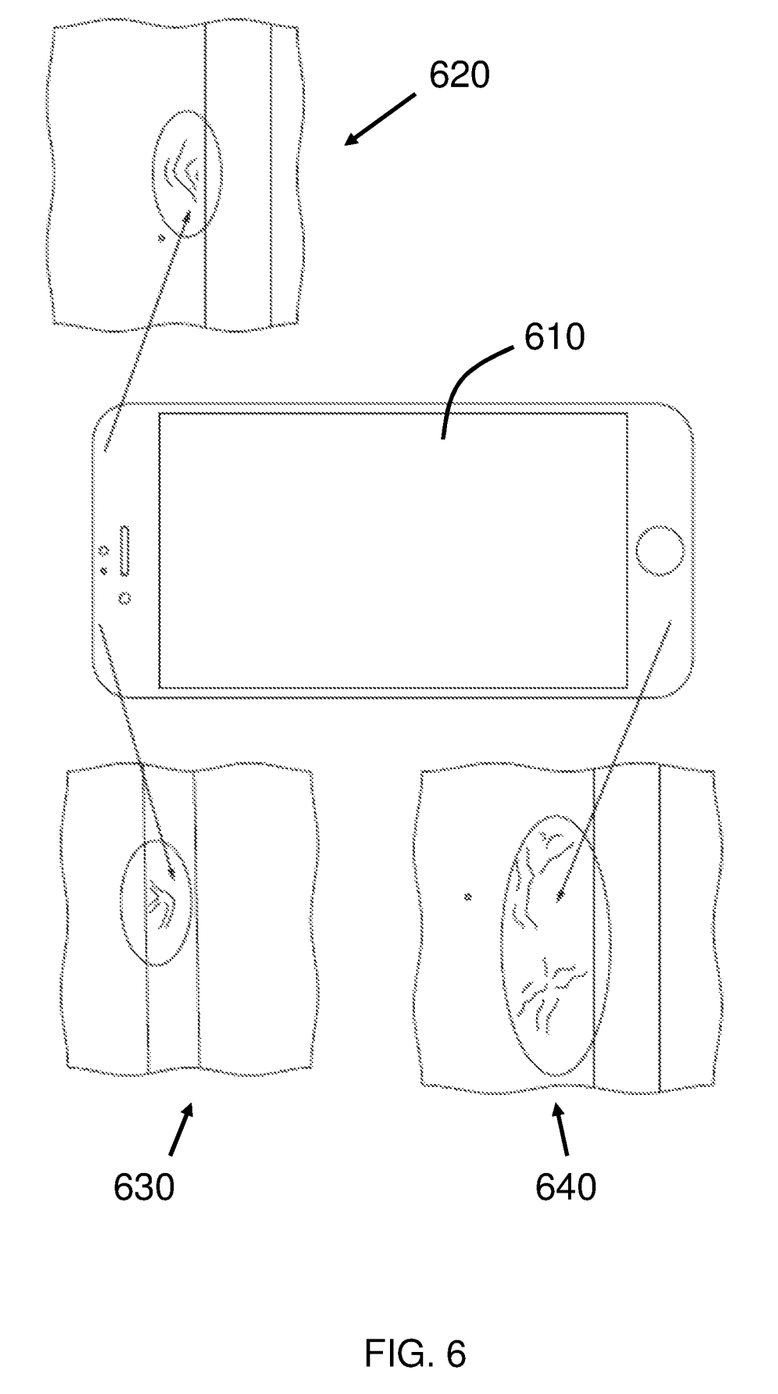
FIG. 6 shows defects captured by the optical inspection system with bright field illumination in accordance with an example embodiment.

FIG. 6 shows defects captured by the optical inspection system with bright field illumination in accordance with an example embodiment.

By way of example, a white phone 610 is inspected by the optical inspection system discussed herein and defects on the edge of the phone is detected.

As shown in FIG. 6, the optical inspection system captures photographs to expose crashes 620, 630 and 640 on the edges and on the top surface of the phone.

Figure 7:
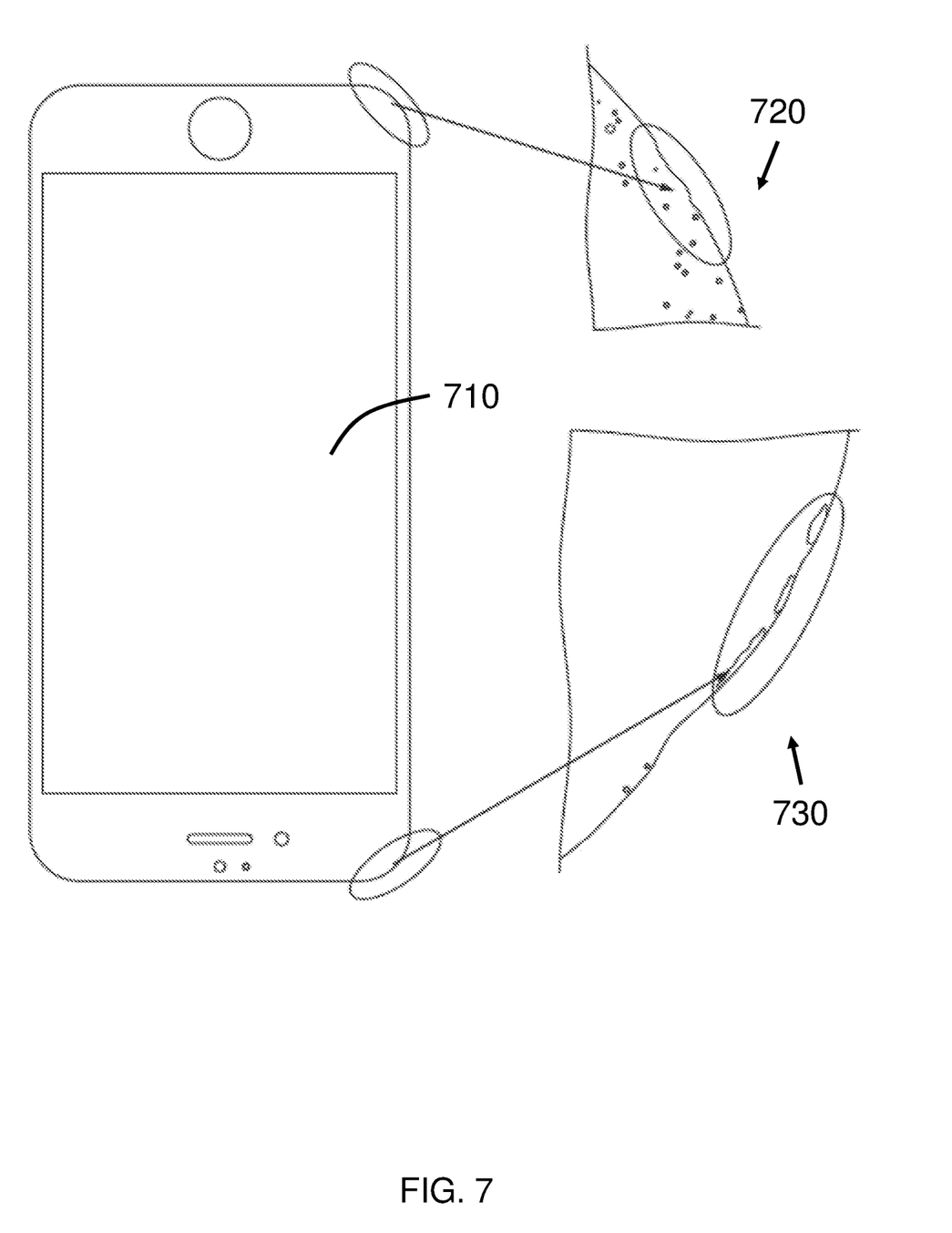
FIG. 7 shows defects captured by the optical inspection system with dark field illumination in accordance with an example embodiment.

FIG. 7 shows defects captured by the optical inspection system with dark field illumination in accordance with an example embodiment.

By way of example, a black phone 710 is inspected by the optical inspection system discussed herein and defects on the edge of the phone is detected. As shown in FIG. 7, the optical inspection system captures photographs to expose edge cracks 720 on the top edge of the phone and edge cracks 730 on the bottom edge of the phone.

As used herein, an "optical inspection system" is a system with optical devices that inspects objects.

As used herein, a "linear light source" is a light source emitting light from a region which has one large dimension. A linear light source could be shaped like a tube with circular, square or other cross section, for example, a bank of LEDs or a fluorescent tube.

As used herein, a "diffuser" is a device that diffuses or spreads out or scatters light in some manner. Examples of a diffuser include, but are not limited to, ground glass diffusers, teflon diffusers, holographic diffusers, opal glass diffusers, and greyed glass diffusers.

As used herein, a "bright field system" provides bright-field illumination.

As used herein, a "dark field system" provides dark-field illumination.

As used herein, a "subimage" is an image that represents a region of the object under inspection.

As used herein, a "TDI camera" is a camera that includes a TDI CCD or CMOS image sensor that has multiple elements arranged in a matrix-shape with an M×N configuration, with M and N being integers greater than 1.

The methods and apparatus in accordance with example embodiments are provided as examples, and examples from one method or apparatus should not be construed to limit examples from another method or apparatus. Further, methods and apparatus discussed within different figures can be added to or exchanged with methods and apparatus in other figures. Further yet, specific numerical data values (such as specific quantities, numbers, types, degrees, etc.) or other specific information should be interpreted as illustrative for discussing example embodiments.

What is claimed is:

1. A dark field system that detects defects of an object, comprising:
    a first illuminating system configured to emit three light beams, including:
        a first linear light source that has a length longer than a width of the object, and that is configured to project a light beam on a top surface of the object along a scan line across the width of the object; and
        first two linear light sources disposed at respective sides of the first linear light source, each of the first two linear light sources forms an angle within a range of 35-45 degrees with the first linear light source and are configured to project a light beam on a respective side surface of the object, wherein the first linear light source and the first two linear light sources are arranged along a first axis;
    a second illuminating system that emits three light beams, including:
        a second linear light source that has a length longer than the width of the object, and that is configured to project a light beam on the top surface of the object along the scan line across the width of the object; and
        second two linear light sources disposed at respective sides of the second linear light source, each of the second two linear light sources forms an angle within a range of 35-45 degrees with the second linear light source and are configured to project a light beam on a respective side surface of the object;
    a camera, positioned between the first illuminating system and the second illuminating system, and that is positioned so that light reflected from the first linear light source, the first two linear light sources, the second linear light source, and the second two linear light sources is outside an area seen by the camera while the camera receives scattered light from the object and captures a subimage of the object along the scan line; and
    an image processing system that receives each subimage from the camera, stitches the subimages, and detects defects on an edge between the top surface and the side surface of the object,
    wherein the three light beams from the first illuminating system and the three light beams from the second illuminating system converge on a straight line across the width of the object; and
    wherein the first illuminating system and the second illuminating system emits the light beams simultaneously when the camera captures the subimage of the object.

2. The dark field system of claim 1, wherein an incident light from the first and second illuminating systems forms an angle within a range of 20-30 degrees with a normal line of the top surface from a side-view of an optical inspection system.

3. The dark field system of claim 1, wherein the camera includes a lens and a plurality of pixel sensors arranged in a matrix-shape with a 1×N configuration, with N being integers greater than 1, and wherein the second linear light source and the second two linear light sources are arranged along a second axis distinct from the first axis and substantially parallel to the first axis.

4. The dark field system of claim 1, wherein a central axis of the camera coincides a normal line of the top surface of the object such that the camera receives scattered light from the object that is under illumination of the first and second illuminating systems.

5. The dark field system of claim 1 further comprising:
    a controller that controls the angle between the first linear light source and the first two linear light sources of the first illuminating system and the angle between the second linear light source and the second two linear light sources of the second illuminating system based on a shape and an orientation of the side surface of the object.

* * * * *